Sept. 6, 1960 D. G. MARK ET AL 2,951,366
THUMP AND ROUGHNESS METER
Filed Aug. 8, 1956
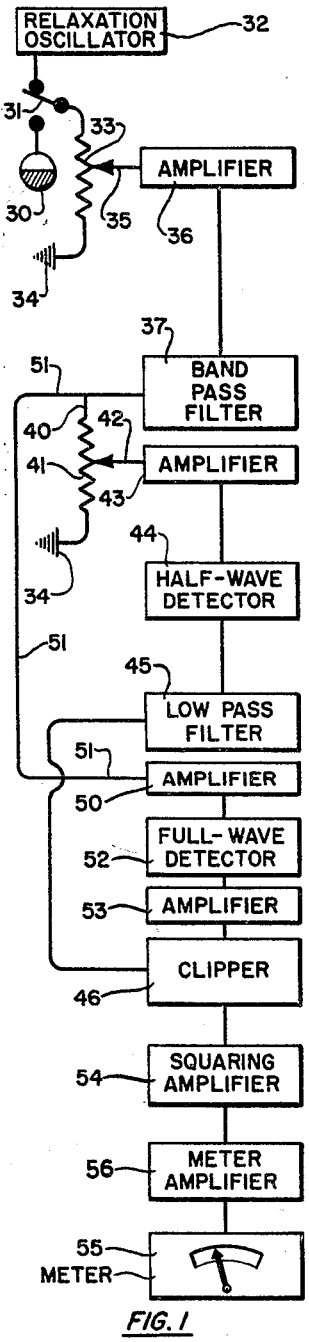
FIG. 1
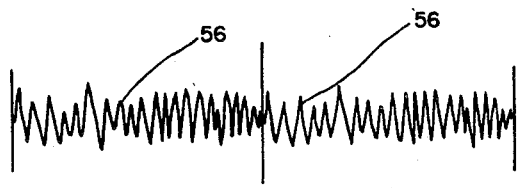
FIG. 2
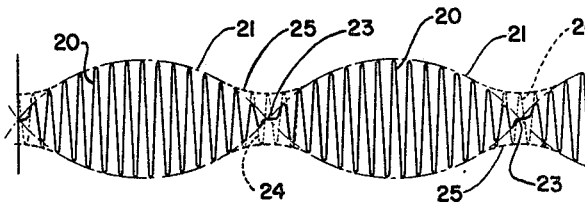
FIG. 3
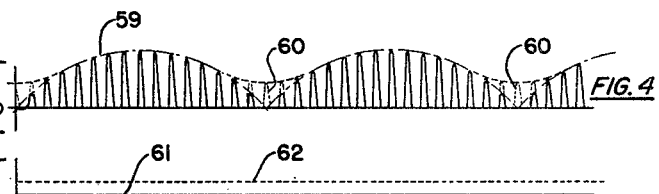
FIG. 4
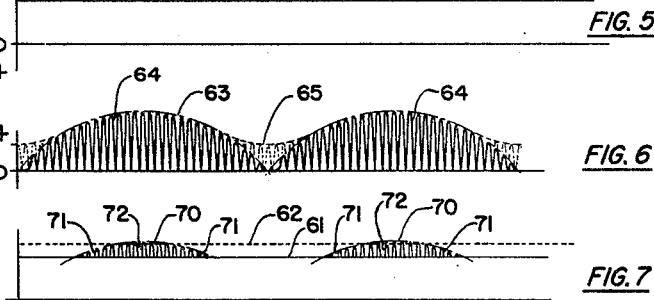
FIG. 5
FIG. 6
FIG. 7
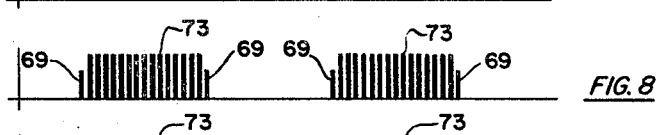
FIG. 8
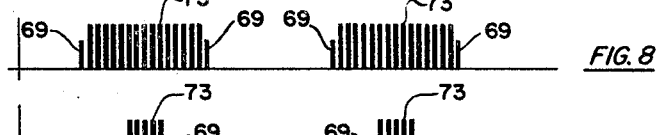
FIG. 9
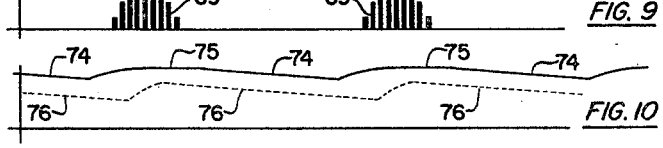
FIG. 10
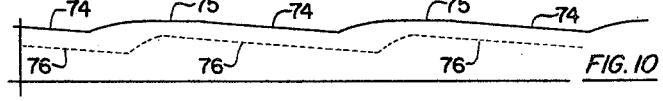
INVENTOR.
DONALD G. MARK
EDGAR A. NASH
BY
*Gray, Mase & Dunson*

2,951,366

THUMP AND ROUGHNESS METER

Donald G. Mark and Edgar A. Nash, Columbus, Ohio, assignors, by mesne assignments, to The Goodyear Tire & Rubber Company, Akron, Ohio, a corporation of Ohio Filed Aug. 8, 1956, Ser. No. 602,785

10 Claims. (Cl. 73—146)

This invention relates to electrical measuring or indicating apparatus. More particularly, this invention relates to apparatus for segregating "tire thump" and "roughness" vibrations which are generated in vehicles provided with tires, and for measuring and indicating the quantity and quality of these vibrations.

"Tire thump" is a vibration pattern often generated in modern motor vehicles having rubber tires. It is conventionally recognized by persons versed in the automotive vehicle and automotive tire fields of technology under its descriptive name "tire thump." This tire thump vibration phenomenon is considered as a source of annoyance by occupants of vehicles with which it is associated. It is perceived by these occupants as a reoccurring audible thumping sound distinguishable from the normal sounds associated with the vehicle.

"Roughness' is also a vibration pattern often generated in modern motor vehicles having rubber tires. The vibration pattern of roughness is distinguishable from thump and is recognized by persons versed in the art under the descriptive name "roughness." Roughness is considered as a source of annoyance by vehicle occupants and is perceived as a sound characteristically comparable to that of grinding gears.

It has been established that the tire thump and roughness vibrations originate from and are caused by irregularities in the tires on a vehicle in which the characteristic annoyance is found. It is believed that the vibrations are carried through the suspension system of the vehicle and into the body and frame members, and that certain frequency vibrations are amplified and accentuated by mechanical resonances in the structure. According to the presently believed theory of thump and roughness generation, the vibrations occasionally are caused by the existence of a single sharp irregularity in a tire, but more often they are caused by a random pattern of irregularities. In this theory the possibility is recognized that a basic pattern of irregularities may possibly be built into tires because of the thread design, because of the criteria provided for the spacing of cord splices, or because of other systematic conditions that exist in the building of a tire. Such a built-in pattern of irregularities might cause a basic level of roughness and thump that would not be strongly objectionable by itself, but which might become objectionable when augmented by other accidental irregularities in a tire.

The thump and roughness vibrations are known to be of a complex nature, and probably involve rotational oscillation of the wheel and tire about each of three mutually perpendicular axes as well as linear vibration of the wheel in at least two mutually perpendicular directions. Although the dominant vibration is believed to be linear in the fore and aft direction and rotational about the axis of wheel revolution, a rotational oscillation at least about the vertical axis would inevitably be associated with the dominent vibration. Through gyroscopic action, a change in wheel rotation rate may change the nature and extent of the linkage between rotational oscillation about the vertical axis and rotational oscillation about the longitudinal axis. Hence, gyroscopic action should cause corresponding changes in any resonant thump or roughness system involving either of these rotational oscillations, either as a primary factor or as a linkage with linear vibration in any direction.

An additional discussion of the theory of the generation of tire thump phenomenon is found in U.S. Patent No. 2,735,292. While the theory therein expressed appears plausible and reasonable with respect to the cause and manner of tire thump generation, it has been found that the quantity or amplitude alone of the sound vibration is not the best measure or indication of the annoyance perceived and recognized by the occupants of a vehicle.

It has been found that persons skilled and experienced in the art of determining the answer to the question of whether a particular tire should be rejected or passed after manufacture, will not render these decisions consistently with measurements of tire thump taken on apparatus registering a purely quantitative indication. However, in the apparatus of this invention for measuring tire thump and roughness, the quality or intrinsic character of the thump vibration is sensed and measured in conjunction with the quantity, to provide a composite indication of the total character of the phenomenon present. "Quality" or intrinsic character is a function of the percentage of modulation and regularity of reoccurrence in the vibration pattern. It has been found that the apparatus of this invention provides an indication which correlates with the opinion of experienced thump test experts, and therefore provides a better indication of the tire thump.

Since tire thump and roughness originate in substantially the same manner, it is an accepted matter of convenience to consider and study them together. Each results in an annoyance to the occupants of a vehicle and it has been found that they usually occur together. Therefore, in the following description time thump and roughness will be discussed together except where their characteristics differ and statements with regard to tire thump are not applicable to roughness. Although the single term "thump" is used, roughness should be considered a part thereof unless otherwise differentiated.

The study of tire thump phenomenon and its future hoped-for elimination has been hampered in the past by the lack of a reliable "thumpmeter." By thumpmeter is meant a means of providing an objective indication of the thump characteristics of a particular tire. The subjective method of rating tires used in the past by persons experienced in recognizing when the total amount of thump present would be likely to cause annoyance has not been satisfactory. Subjective thump ratings such as "good," "medium thump," and "bad thump" are relatively poor bases for comparison.

This invention has for its purpose the provision of tire thump measuring apparatus capable of objectively discerning and indicating the degree of tire thump annoyance associated with an automobile and in particular with the tires thereon. It has as a purpose the provision of means for the establishment of objective tire thump ratings. This invention has for a further purpose the provision of thump measuring apparatus of maximum accuracy and reliability.

A purpose of the present invention is to segregate the particular vibrations characteristic of tire thump from the other vibrations present in a vehicle and to exclude these other vibrations from the measurement and indication provided by the apparatus. It is still another purpose to provide an electrical signal wave representative of tire thump present in the total vibration phenomenon being received and sensed by the apparatus. It is yet another purpose to separate this representative signal into channels for further signal conversion. It is another purpose to convert the representative signal in one channel to an unmodulated average voltage having a magnitude representative of the signal, including the percentage of modulation of the representative signal wave envelope, and the regularity of reoccurrence of modulation in the representative signal characteristics. It is still another purpose to convert the representative signal to a signal of purely positive or negative components in the second channel. It is a further purpose to impress the unmodulated signal of one channel upon the signal of the second channel and to thereby exclude from the signal those portions thereof that are less representative of tire thump. It is a further purpose to measure and integrate the remaining signal portions, as a composite indication of the quality and quantity of tire thump phenomenon in the vibration pattern received by the apparatus.

Other objects and features of the present invention will be apparent from the following description, drawings, and diagrams.

In the drawings:

Fig. 1 is a diagrammatic block drawing showing the various components of the apparatus of this invention and their interconnection;

Fig. 2 is a diagram of an oscillogram of the complex vibration pattern present in a vehicle and sensed by the apparatus;

Fig. 3 is a simplified representative diagram of a typical thump vibration segregated by the apparatus of this invention;

Fig. 4 is a diagram of the tire thump representative electrical signal after being subjected to half-wave detection;

Fig. 5 is a diagram of the representative electric signal after being filtered of the alternating-current component;

Fig. 6 is a diagram of the representative electric signal after being subjected to full-wave detection;

Fig. 7 is a diagram of the remaining portions of the representative electric signal after the exclusion of those portions of the full-wave detected electric signal less representative of tire thump;

Fig. 8 is a diagram of those remaining portions of the representative signal after being amplified to the same voltage;

Fig. 9 is a diagram of those remaining portions of the representative signal after being amplified to the same voltage, but differing from Fig. 8 in the number of portions remaining; and Fig. 10 is a diagram of the condensed representative signal capable of operating a meter for the indication of the quantity and quality of tire thump.

To facilitate the understanding of the apparatus and its method of operation the following further discussion of tire thump theory is provided. It has been found that tire thump is a beat interference phenomenon that occurs in the range of approximately 15 to 50 miles per hour between two different-frequency vibrations or tones whose frequency difference is equal to the wheel speed of the vehicle on which a particular thump-generating tire is rotated. The tones are produced by higher order vibrations and occur at harmonics of the wheel speed. Interference between successive harmonic tones produces a first order difference vibration which is heard as one thump for each revolution of the wheel. For example, tire thump may be heard in a vehicle traveling at 30 miles per hour. It may be assumed that the fifth and sixth harmonic tones of the wheel speed are strongly generated. With typical tire sizes, the wheel speed is approximately six revolutions per second at 30 miles per hour, and these harmonic tones excite structural or acoustical resonances in the car at or near 30 and 36 cycles per second, respectively. By reason of the slightly different frequency of the generated tones, these two successive harmonic frequencies will beat or interfere so as to produce a resulting sound wave 20, similar to that indicated in Fig. 3. The time interval between successive maxima or minima in the wave envelope 21 will be equal to the time for one revolution of the wheel. The envelope 21 will have a slow cyclic variation of six cycles per second corresponding to the frequency difference between the successive harmonic tones generated and beating. Although the human ear cannot detect pure tones of such low frequency as that represented by the envelope curve 21, the ear is able to sense changes in the amplitude of the wave 20 and the human brain is capable of discerning the changes in the quality or intrinsic character of the wave 20 between successive beat cycles. The regularity of the modulation of pure tones causes them to stand out although many other extraneous sounds are present making the composite noise have a representative irregular form similar to that shown in Fig. 2.

Roughness has the same characteristics as tire thump and is produced in the same manner except that roughness is believed to be the beating of harmonic tones which are not successive. Thus, in the example above, if the fourth and sixth harmonic tones or the fifth and seventh harmonic tones were to beat in addition to the successive harmonic beating tones of tire thump, a strongly generated roughness vibration would be present.

As shown by the full lines in Fig. 3, the wave 20 may be 100 percent modulated and the envelope formed will thus be reduced to 0 at a point 23 in each cycle. On the other hand, the wave form 20 may be modulated to a lesser degree and take the characteristic form shown by the dashed lines 24. In the case where the wave 20 is modulated to a lesser degree, or percentage, the wave envelope 21 will have the characteristic form shown by the dashed lines 25. It has been found that the percentage of modulation often changes between successive cycles in the tire thump vibration pattern.

In conjunction with the changes in the percentage of modulation it has been found that the regularity of reoccurrence of modulation is also a characteristic of the tire thump phenomenon, and that these two characteristics combine to form a "quality" factor that contributes to the over-all annoyance recognized as tire thump.

Referring to Fig. 1, a transducer or microphone 30 sensing means is connected to one pole of a two-position switch 31. A relaxation oscillator 32 is connected to the other pole of the two-position switch 31. The common position of the switch 31 is connected through an input gain variable potentiometer 33 to ground 34. The adjustable contact 35 of the variable potentiometer 33 is connected through an amplifier 36 to a band-pass filter 37. By means of a line 40 the band-pass filter 37 is connected through an input gain variable potentiometer 41 to ground 34. The movable contact 42 of the variable potentiometer 41 is connected through an amplifier 43 to a half-wave detector 44. Connected to the half-wave detector 44 is a low-pass filter 45, and the low-pass filter 45 is connected to the bias circuit of a clipper 46.

An amplifier 50 is connected through a line 51 to the band-pass filter 37. The amplifier 50 is connected to a full-wave detector 52 which is followed by and connected to an amplifier 53. The amplifier 53 is connected to a primary signal circuit of the clipper 46. A squaring amplifier 54 is connected to the output side of the clipper 46. The squaring amplifier 54 is connected to a meter 55 through a meter amplifier 56.

The various individual components of the apparatus combination are conventional and the circuits therefor may be found in published journals of electronic technology.

In the construction of the thumpmeter apparatus of this invention, the various components represented in Fig. 1 may be housed in a cabinet of a size to rest conveniently upon the front seat of a vehicle. Circuits in the apparatus may be adapted to operate at the voltage and power conventionally provided in the present-day vehicle. Connection may be made to the source of power by means of a standard plug-in connector adapted to fit in the cigar lighter of the vehicle, or other suitable connection means may be provided.

The microphone or transducer 30 is of a highly sensitive type adapted to receive sounds of the lower range of audio-frequency below 100 cycles per second. The reception of sound above this range has been found to be of no value in the detection and measurement of tire thump. It is presently believed, and tests have shown, that in the modern automobile, important tire thump vibrations are in the frequency range between 20 and 45 cycles per second. In tests made on an apparatus constructed according to this invention, excellent correlation has been found between the thump measurements made by the apparatus and the judgments pronounced by experienced thump testing personnel when frequencies greater than 45 cycles per second and less than 20 cycles per second have been excluded from the measurements furnished by the apparatus.

More particularly, in any individual vehicle being tested it has been found that predominant thump is confined to a band of frequencies narrower than the range between 20 and 45 cycles per second. In any individual vehicle predominant thump is usually confined to the frequencies in a frequency band of about 8 cycles per second. The center of this frequency band will usually fall between 20 and 45 cycles per second.

The relaxation oscillator 32 is of conventional construction and is arranged to provide an output electrical signal having a wave form of uniformly spaced voltage pulsations, or "spikes," of uniform magnitude and uniform continuous reoccurrence. When it is desired to calibrate the apparatus, the movable contact of the switch 31 is closed with respect to the relaxation oscillator 32, and the output signal of the oscillator 32 is transmitted into the thumpmeter apparatus. In the apparatus that was constructed according to this invention, the output frequency of the relaxation oscillator 32 was six cycles per second, which is the approximate wheel revolution rate of a vehicle traveling at 30 miles per hour, and falls approximately in the center of the thump speed range.

Adjustment means may be provided in a conventional manner as necessary in components of the thumpmeter circuit. For instance, in the thumpmeter which was constructed according to this invention, frequency adjustment means was provided in the band-pass filter 37. Adjustment in the sensitivity of the various amplifiers was also provided by the variable potentiometers 33 and 41.

After the thumpmeter circuit has been adjusted and tuned by means of the various adjustment controls so that the indication provided by the meter 55 correlates with an established arbitrary standard, the movable contact of the switch 31 may be moved to make contact with the pole connected to the microphone 30.

The microphone 30 receives all of the complex sound vibrations within its range of sensitivity existing in the vehicle. These sound vibrations are converted into a complex irregular pattern of electrical signals representative thereof. The electric signal at this stage appears similar to the diagram of an oscillogram thereof, as shown in Fig. 2.

The electric signal 56, hereinafter referred to as the input signal, is amplified in the amplifier 36 and is passed through the band-pass filter 37. The band-pass filter 37 excludes from the input signal 56 those components of the input signal outside the frequency band to which the filter 37 is adjusted. The peak response frequency of the filter 37 may be adjusted to the center of the predominant thump band for a particular vehicle being tested. When an over-all Q of approximately four is provided, a frequency band width of about 8 cycles per second will be passed and transmitted. It has been found that although only a narrow band of frequencies may be passed, if the center of the band or the peak response frequency is adjusted to the frequency of predominant thump of an individual vehicle, better thump indications will be provided.

The range of adjustment of the peak response at the band-pass filter 37 should be from 25 to 40 cycles per second, because frequencies outside this range may be satisfactorily excluded from the input signal 56 on almost any present-day vehicle. Frequencies outside the range of between 25 and 40 cycles per second have been found to be not representative of tire thump in present-day vehicles.

While it has been found preferable to use only one filter 37, if it is desired to broaden the range of frequency response, more than one band-pass filter may be provided and the several band-pass filters may have their peak response ranges staggered by tuning. However, this has not been found necessary in the apparatus which has been constructed.

The electrical signal wave transmitted by the filter section 37 has a form similar to that shown in Fig. 3. As previously described, this signal is representative of the tire thump audible sound vibration. The representative signal transmitted will vary as to magnitude of maximum voltage, envelope percentage of modulation, and regularity of reoccurrence in conformity with tire thump characteristics.

The transmitted representative signal from the filter 37 is carried through the variable potentiometer 41, and amplifier 43, to the half-wave detector 44. The half-wave detector 44 rectifies the signal by excluding components of one polarity from the alternating current, and transmits a one-polarity signal that is representative of the signal from filter 37. It will be seen that certain of the characteristics of the signal transmitted from the filter 37 are preserved, including the maximum voltage, percentage of modulation, and the regularity of reoccurrence existent in the filtered signal. The signal thus transmitted by the half-wave detector 44 has a form 59 similar to that diagrammatically shown in Fig. 4. As shown by the dashed lines 60, the signal may be less than 100 percent modulated and this characteristic will be preserved in the detected signal 59. The half-wave detector 44 is arranged so that the polarity of the detected signal is negative with respect to ground. Therefore, when it is connected as the bias voltage at the input to the clipper 46, this output voltage will subtract from the voltage output of the detector 52. In Figs. 4 and 5, the D.-C. components of the signal are shown on the positive side of the base line of the graphs as a matter of descriptive convenience to facilitate the understanding of Fig. 7, wherein the signal transmitted from the clipper 46 is shown with the voltage subtraction having taken place. Therefore, the signal represented by lines 61 and 62 in Fig. 5 is of opposite polarity to that of the signal represented in Fig. 6.

The signal from the half-wave detector 44 is transmitted to the low-pass filter 45 that is constructed to have sufficiently low-pass characteristics as to pass only a D.-C. average component of the input signal, which will be of a magnitude that will vary in accordance with the signal characteristics carried through the half-wave detector 44.

As shown in Fig. 5, this unmodulated D.-C. component may have a value corresponding to the full line 61, if the signal is 100 percent modulated, or it may have a value corresponding to the dashed line 62, if the signal is less than 100 percent modulated, for the same maximum amplitude. Thus the output of the low-pass filter 45 varies in accordance with the percentage of modulation as well as with the maximum amplitude of the representative signal.

The D.-C. signal is transmitted to the clipper 46 and applied as a variable negative bias to the clipper 46 circuit.

The signal transmitted from the filter 37 is also carried through the line 51 and the amplifier 50 to the full-wave detector 52. In the full-wave detector 52, the envelope 63 of the representative transmitted signal is preserved, while the high frequency component 64 of the signal is doubled in frequency. As shown in Fig. 6, the percentage of modulation is retained as a characteristic of the signal and may vary as shown by the dashed lines 65. Signals from the full-wave detector 52 are amplified in the amplifier 53 which provides a phase inversion. From the amplifier 53, the inverted signal is transmitted to the clipper 46.

In the clipper 46, the D.-C. voltage from the low-pass filter 45 is impressed as the negative bias, and since the full-wave detected signal has positive and opposite polarity the clipper 46 excludes and subtracts those portions of the detected carrier signal that vary very little with tire thump. The remaining portions vary appreciably with tire thump and are quite representative of the characteristics of tire thump. This is because the clipper 46 excludes all of the signal depicted in Fig. 6 below a minimum value, and thus constitutes a convenient means for comparing the amplitude of the full-wave detected signal 64 or 65 with its average value 61 or 62, respectively. The signal transmitted from the clipper 46 is similar to that diagrammatically shown in Fig. 7 wherein the modulation peaks 70 of the detected signal remain. This clipper stage 46 is arranged to permit a considerable portion of each modulation peak 70 to pass when the filtered signal is 100 percent modulated. The relative amount of a particular peak 70 which is passed decreases with the percentage of modulation as the corresponding value of the negative bias signal 61 increases as shown by the dashed line 62. When the percentage of modulation decreases to the point that no thump exists, the negative bias signal on the clipper 46 will rise above the modulation peaks 70 and the peaks 70 will be eliminated from the clipper 46 output. However, under thump conditions, the output of the clipper stage appears as a train of pips 72 of unequal amplitude arranged in groups corresponding to the modulation peaks. The number of pips 72 in each group depends on the relationship between the percent of modulation of the modulated signal and the clipper bias signal.

Since the frequency of the high-frequency component of the representative signal that is transmitted to the input of the clipper 46 has been previously doubled in the full-wave detector 52, the number of pips 72 remaining is twice that which would have otherwise been transmitted by the clipper 46. This has the effect of improving the resolution of the measurement of small changes in the amount of modulation peaks 70 passed by the clipper 46.

While it is known to provide a clipper having a negative bias that is fixed or manually adjustable, the arrangement of this invention, having an automatically variable negative bias is believed to be novel. The successful operation of the invention depends on the adjustment and establishment of a proper relationship between the signal from the low-pass filter 45 and the signal from the full-wave detector 52. This relationship must be established so that the bias signal will vary between limits over the range of modulation encountered in the representative signal.

The signal from the clipper 46 is fed into the squaring amplifier 54 which amplifies substantially all of the pips 72 to fixed-amplitude pips 73, as shown in Figs. 8 and 9.

However, those pips 71 at the beginnings and ends of the modulation peaks 70 are not amplified to the full fixed value because they are of insufficient magnitude to reach the fixed amplitude value even when amplified. These marginal pips 71 appear as pips 69 of lower value at the ends of each fixed-amplitude pips 73 group.

The number of fixed-amplitude pips 73, shown in Fig. 8, is representative of the number which might be present when the percentage of modulation is high and thump conditions are severe. The number of fixed-amplitude pips 73, shown in Fig. 9, depicts the number which might be present when the percentage of modulation is relatively lower and thump conditions are less severe.

Following the squaring amplifier 54, the signal is transmitted to the meter amplifier 56 where it is amplified.

The meter amplifier 56 is biased so that it reproduces only the upper portions of the fixed-amplitude pips 73, and therefore, some of the marginal pips 69 are lost from the amplified signal that is transmitted to the meter 55.

The meter 55 integrates the signal and indicates quantitatively the rate at which the fixed-amplitude pips 73 are being supplied, which rate has been made proportional to the quantity and quality of thump present in the vehicle.

The meter 55 is provided in conventional fashion with a meter condenser of large capacity. The meter condenser serves to smooth out the signal received from the meter amplifier 56 and to provide a signal form similar to that diagrammatically shown in Fig. 10.

In Fig. 10, the line line 75 represents the level of current that may pass through meter 55 when a larger number of pips 73 is indicated such as that represented in Fig. 8. The dashed line 76 represents the level of current that may pass through the meter 55 when a smaller number of pips 73 is indicated, such as that represented in Fig. 9.

The variation in the wave form 76 shown in Fig. 10 is exaggerated for purposes of illustration, as the depressions 74 between modulation peaks 75 are for practical purposes unappreciable and the meter 55 indication is steady when thump is constant. The meter condenser provides sufficient dwell between successive modulation peaks 75 or "pip counts" and thus prevents needle waver and irregularity in indication thereby.

The preceding discussion describes the manner by which the number of voltage pips 73 presented to the integrating meter 55 is varied as a function of percentage of modulation. However, the number of voltage pips 73 presented to the integrating meter 55 also varies as a function of the amplitude of the thump representative wave.

It will be seen that the number of marginal voltage pips 71 occurring in a modulation peak 70 depends on the slope of the envelope at the ends of the modulation peak. Thus the number of low-value pips 69 will be less when the amplitude of the representative signal is higher, and the number will be greater when the amplitude of the representative signal is lower. Since these low-value pips 69 are lost in the meter amplifier 56 and the number thereof varies with the amplitude of the representative signal, the meter 55 indication varies as a function of the amplitude.

Among the advantages found to be furnished by this invention over the prior art are (1) the provision for segregation of the tire thump-representative signals from other signals not representative thereof and (2) the degree of refinement afforded by the clipping operation to the transmitted signal. It will be seen that the clipping operation increases the ratio of thump-representative signal components which are subject to change with respect to the total transmitted signal from the full-wave detector.

The sensitivity and reliability of the indication of tire thump provided by the apparatus of this invention is further enhanced by the fact that the thump-representative signal itself (transmitted by the band-pass filter 37) is converted and used as the variable negative bias in the clipper 46. It will be seen that thereby the bias voltage is automatically adjusted responsively to the variation of and to the character of the thump-representative signal being transmitted from the filter section 37.

It will be understood, of course, that, while the forms of the invention herein shown and described constitute preferred embodiments of the invention, it is not intended herein to illustrate all of the possible equivalent forms or ramifications of the invention. It will also be understood that the words used are words of description rather than of limitation, and that various changes, such as changes in arrangement of parts, may be substituted without departing from the spirit or scope of the invention herein disclosed.

What is claimed is:

1. Apparatus for segregating tire thump vibrations from other vibrations in a vehicle having tires and for providing a composite quantitative and qualitative indication of tire thump conditions with respect to the vehicle comprising: means for sensing and converting the vibrations produced in said vehicle into electrical signal waves representative thereof; means connected to said sensing means for excluding from said electrical signal those components not representative of tire thump and for transmitting those components representative thereof; first means connected to said transmitting means for deriving from said thump-representative signal components a first unmodulated electric signal representative of the average intensity of said thump-representative electric signal; second means connected to said transmitting means for deriving from said thump-representative electric signal a modulated electric signal representative of the variation in amplitude and modulation of said transmitted thump-representative electric signal; means connected to said first and second deriving means for subtractively impressing said first electric signal upon said second electric signal to derive a third electric signal representative of tire thump conditions both quantitatively and qualitatively; and means connected to said impressing means for indicating the intensity of said third electric signal.

2. Apparatus for segregating tire thump vibrations from other vibrations in a vehicle having tires and for providing a composite quantitative and qualitative indication of tire thump conditions with respect to the vehicle comprising: means for sensing and converting the vibrations produced in said vehicle into electrical signal waves representative thereof; means connected to said sensing means for excluding from said electric signal those components having a frequency less than 25 cycles per second and those components having a frequency greater than 40 cycles per second, and for transmitting those remaining components which are representative of tire thump; first means connected to said transmitting means for deriving from said thump-representative signal components a first unmodulated electric signal representative of the average intensity of said thump-representative electric signal; second means connected to said transmitting means for deriving from said thump-representative electric signal a modulated electric signal representative of the variation in amplitude and modulation of said transmitted thump-representative electric signal; means connected to said first and second deriving means for subtractively impressing said first electric signal upon said second electric signal to derive a third electric signal representative of tire thump conditions both quantitatively and qualitatively; and means connected to said impressing means for indicating the intensity of said third electric signal.

3. Apparatus for segregating tire thump vibrations from other vibrations in a vehicle having tires and for providing a composite quantitative and qualitative indication of tire thump conditions with respect to the vehicle comprising: means for sensing and converting the vibrations produced in said vehicle into electrical signal waves representative thereof; means connected to said sensing means for excluding from said electric signals those carrier and modulation frequencies not representative of tire thump and for transmitting those carrier and modulation frequencies representative thereof; first means connected to said transmitting means for deriving from said thump-representative signal components a first unmodulated electric signal representative of the average intensity of said thump-representative electric signal; second means connected to said transmitting means for deriving from said thump-representative electric signal an electric signal having a greater ratio of carrier frequency to modulation frequency that is representative of the variation in amplitude and modulation of said transmitted thump-representative electric signal; clipper means connected to said first deriving means and to said second deriving means for subtractively impressing said first electric signal upon said second electric signal to exclude portions of said second electric signal having a voltage magnitude less than said first electric signal; and means for indicating the quantity and regularity of reoccurrence of the remaining portions of said second electric signal.

4. Apparatus for segregating and measuring the tire thump characteristic sound vibrations present in vehicles having tires and for providing a composite indication of the magnitude, percentage of modulation, and regularity of reoccurrence of said tire thump sound vibrations, comprising: microphone means for sensing the sound vibrations produced in said vehicle and for converting said sound vibrations into first electrical signal waves representative thereof; band-pass filter means connected to said microphone means for filtering from said first electrical signal waves those carrier and modulation frequencies not representative of tire thump vibrations and for transmitting those carrier and modulation frequencies representative thereof; first detector means connected to said band-pass filter means to rectify said transmitted frequencies; low-pass filter means connected to said first detector means for filtering the alternating-current components from said rectified signal and for transmitting the average value thereof as a direct-current component at a value proportional to the magnitude, percentage of modulation, and regularity of reoccurence of said transmitted frequencies; second detector means connected to said band-pass filter means for full-wave rectifying the carrier frequency signal by doubling the carrier frequency of said transmitted signal; clipper means connected to said low-pass filter means and to said second detector means for subtractively impressing said direct-current component upon said full-wave rectified signal to exclude portions of said full-wave rectified signal having a voltage magnitude less than said direct-current component; squaring amplifier means connected to said clipper means for amplifying substantially all of the remaining portions of said full-wave detected signal to the same fixed magnitude; and indicator means connected to said squaring amplifier means for providing a composite representation of the quantity, and regularity of occurrence of said remaining portions as a measure of the tire thump characteristic sound vibrations in said vehicle.

5. Apparatus for segregating and measuring the intensity of tire thump characteristic sound vibrations present in vehicles having tires and for providing a composite indication of the magnitude, percentage of modulation, and regularity of reoccurrence of said tire thump sound vibrations, comprising: microphone means for sensing the sound vibrations produced in said vehicle and for converting said sound vibrations into first electric signal waves representative thereof; band-pass filter means connected to said microphone means for substantially filtering from said first electric signal all components except a band of frequencies lying within the frequency range between 20 and 45 cycles per second, said frequency band being less than the said frequency range and transmitted by said filter; first detector means connected to said band-pass filter means to half-wave rectify said transmitted frequencies; low-pass filter means connected to said first detector means for filtering the alternating-current components from said rectified signal and for transmitting the average value thereof as a direct-current component at a value proportional to the magnitude, percentage of modulation, and regularity of reoccurrence of said transmitted frequencies; second detector means connected to said band-pass filter means for full-wave rectifying the carrier frequency components of said transmitted frequencies by doubling the carrier frequency of said transmitted signal; clipper means connected to said low-pass filter means and to said second detector means for subtractively impressing said direct-current component upon said full-wave rectified signal to exclude portions of said full-wave rectified signal having a voltage magnitude less than said direct-current component; squaring amplifier means connected to said clipper means for amplifying substantially all of the remaining portions of said full-wave detected signal to the same fixed magnitude; and indicator means connected to said squaring amplifier means for providing a composite representation of the quantity and regularity of occurrence of said remaining portions as a measure of the tire thump characteristic sound vibrations in said vehicle.

6. Apparatus for segregating and measuring tire thump comprising in combination: a transducer; a band-pass filter connected to the output of said transducer; a half-wave detector connected to the output of said band-pass filter; a low-pass filter connected to the output of said half-wave detector; a full-wave detector connected to the output of said band-pass filter; a clipper connected to the outputs of said full-wave detector and said low-pass filter with the output of said low-pass filter connected as a negative bias in said clipper; and a meter connected to the output of said clipper.

7. Apparatus for segregating and measuring tire thump comprising in combination: a microphone; at least one band-pass filter connected to the output of said microphone having a frequency pass range of between 25 and 40 cycles per second; a half-wave detector connected to the output of said at least one band-pass filter; a low-pass filter connected to the output of said half-wave detector; a full-wave detector connected to the output of said at least one band-pass filter; a clipper connected to the outputs of said full-wave detector and said low-pass filter with the output of said low-pass filter connected as the negative bias in said clipper; and a meter connected to the output of said clipper.

8. Tire thump segregating and measuring apparatus comprising: a microphone sensitive to the lower range of audible sound frequencies below 100 cycles per second; an amplifier connected to said microphone operable to amplify the electric signal generated in said microphone; at least one band-pass filter connected to said first amplifier for filtering out those components of the amplified input signal greater than 40 cycles per second and less than 25 cycles per second; a second amplifier connected to said at least one band-pass filter for amplifying the components transmitted by said filter; a half-wave detector connected to said second amplifier for rectifying said amplified filtered signal; a low-pass filter connected to said half-wave detector to filter said rectified signal and to pass the direct-current average voltage of said rectified signal; a third amplifier connected to said at least one band-pass filter to amplify the signal therefrom; a full-wave detector connected to said third amplifier to rectify and double the frequency of the carrier frequency component of the signal from said third amplifier; a fourth amplifier connected to said full-wave detector to amplify the signal therefrom; a clipper connected to said fourth amplifier to receive the amplified signal therefrom, and connected to said low-pass filter to receive the direct-current voltage signal therefrom and to apply the direct-current voltage as a subtractive negative bias in the bias circuit of said clipper; a squaring amplifier connected to said clipper to receive the intermittent signal therefrom and to raise substantially all the remaining individual carrier frequency components thereof to a fixed magnitude; and a meter with amplifier to provide an indication which is a function of the number and regularity of reoccurrence of the components of the signal received from said squaring amplifier.

9. Apparatus for obtaining a measure of the intensity and intrinsic characteristics of a particular order of different vibrations occurring between combining higher order vibrations which are harmonically related to the rotational speed of the wheels of the vehicle and are excited together with other vibrations by said vehicle, said apparatus comprising: means for sensing and converting the vibrations produced in said vehicle into electric signal waves representative thereof; band-pass filter means connected to said sensing and converting means for filtering from said first electrical signal waves those waves having a frequency less than 25 cycles per second and those waves having a frequency greater than 40 cycles per second, and for transmitting those remaining wave frequencies representative of said particular order of difference vibrations; first means connected to said band-pass filter means for deriving from said remaining wave frequencies a first unmodulated electric signal representative of the average intensity of said particular order of difference vibrations; second means connected to said band-pass filter means for deriving from said remaining wave frequencies a modulated electric signal representative of the variation in amplitude and modulation of said particular order of difference vibrations; clipper means connected to said first and second deriving means for subtractively impressing said first electric signal upon said modulated electric signal to exclude portions of said modulated electric signal having a voltage less than said first electric signal; squaring amplifier means connected to said clipper means for amplifying individually substantially all the remaining portions of said modulated electric signal to the same fixed magnitude; and means to provide an indication which is a function of the number, regularity of reoccurrence and amplitude of said remaining portions as a measure of the particular order of difference vibrations.

10. Apparatus for obtaining a measure of the intensity of the first order difference vibrations resulting from interfering successive higher order vibrations which are harmonically related to the rotational speed of the wheels of a vehicle and are excited together with other vibrations by said vehicle; said apparatus comprising: microphone means for sensing the vibrations produced in said vehicle and for converting said vibrations into first electric signals representative thereof; means connected to said sensing means for excluding from said electric signals those components not representative of said first order difference vibrations and for transmitting those components representative thereof; first detector means connected to said excluding means to rectify said transmitted representative components; low-pass filter means connected to said first detector means for filtering the alternating-current components from said rectified signal and for transmitting the average value thereof as a direct-current component at a value proportional to the magnitude, percentage of modulation, and regularity of reoccurrence of said transmitted representative components; second detector means connected to said excluding means for full-wave rectifying the carrier frequency components of said transmitted representative components; clipper means connected to said low-pass filter means and said second detector means, for subtractively impressing said direct-current component upon said full-wave rectified signal to exclude portions of said full-wave detected signal having a voltage magnitude less than said direct-current component; squaring amplifier means connected to said clipper means for amplifying individually substantially all the remaining carrier frequency portions of said full-wave rectified signal to the same fixed magnitude; and indicator means connected to said squaring amplifier means for providing a composite representation of the number, regularity of reoccurrence and amplitude of said remaining portions as a measure of the quantity and intrinsic characteristics of said first order difference vibrations.

References Cited in the file of this patent

UNITED STATES PATENTS 2,735,292    Apps ------------------ Feb. 21, 1956

UNITED STATES PATENT OFFICE
CERTIFICATE OF CORRECTION

Patent No. 2,951,366                            September 6, 1960

Donald G. Mark et al.

It is hereby certified that error appears in the printed specification of the above numbered patent requiring correction and that the said Letters Patent should read as corrected below.

Column 1, line 31, for " "Roughness' " read -- "Roughness" --; column 2, line 37, for "time" read -- tire --; column 8, line 25, for "line", first occurrence, read -- full --.

Signed and sealed this 11th day of April 1961.

(SEAL)

Attest:
ERNEST W. SWIDER
Attesting Officer

ARTHUR W. CROCKER
Acting Commissioner of Patents